United States Patent [19]

Schmidt et al.

[11] Patent Number: 5,531,994
[45] Date of Patent: Jul. 2, 1996

[54] FEED ADDITIVE CONTAINING ZINC BACITRACIN

[76] Inventors: Michael Schmidt, Hammergasse 88; Werner Bomann, Albrecht-Dürer Strasse No. 21; Dietrich W. Janott, Mühlstrasse 13; Herbert Werner, Binger Strasse 228, all of D-6507 Ingelheim am Rhein, Germany

[21] Appl. No.: 241,514

[22] Filed: May 12, 1994

Related U.S. Application Data

[63] Continuation of Ser. No. 124,131, Sep. 20, 1993, abandoned, which is a continuation of Ser. No. 929,737, Aug. 13, 1992, abandoned, which is a continuation of Ser. No. 792,547, Nov. 15, 1991, abandoned, which is a continuation of Ser. No. 655,268, Feb. 13, 1991, abandoned, which is a continuation of Ser. No. 487,688, Mar. 2, 1990, abandoned, which is a continuation of Ser. No. 211,347, Jun. 24, 1988, abandoned, which is a continuation of Ser. No. 745,919, Jun. 18, 1985, abandoned.

[30] Foreign Application Priority Data

Jun. 20, 1984 [DE] Germany .......................... 34 22 782.2

[51] Int. Cl.[6] .......................... A01N 25/00; A23K 1/18; A61K 9/16; A61K 9/50; A61K 38/16
[52] U.S. Cl. .......................... 424/405; 424/438; 424/494; 424/497; 514/6
[58] Field of Search .......................... 514/6; 424/405, 424/438, 494, 497

[56] References Cited

U.S. PATENT DOCUMENTS

| 3,627,885 | 12/1971 | Rondelet | 514/6 |
| 3,829,564 | 8/1974 | Merry et al. | 424/78 |
| 4,096,246 | 6/1978 | Oystese | 514/6 |
| 4,164,572 | 8/1979 | Oystese | 514/6 |

FOREIGN PATENT DOCUMENTS

| 95489 | 7/1975 | Japan . |
| 129728 | 10/1975 | Japan . |

Primary Examiner—Kimberly Jordan
Attorney, Agent, or Firm—Robert P. Raymond; Wendy E. Reider; Alan R. Stempel

[57] ABSTRACT

A novel zinc bacitracin—containing animal feed additive, in particulate form, has been discovered having an externally coating with a polymer such as an alkyl cellulose polymer. The novel composition shows significant improvement in stability with respect to long term storage over a wide range of temperatures and in admixture with a wide range of animal feeds, and a substantial reduction in odor. In a preferred embodiment, the zinc bacitracin—containing feed additive comprises zinc bacitracin, a fermentation residue and calcium carbonate. A novel process for producing the zinc bacitracin containing feed additive minimizes the formation of dust sized particles.

12 Claims, No Drawings

FEED ADDITIVE CONTAINING ZINC BACITRACIN

This is a continuation, of application Ser. No. 124,131, filed Sep. 20, 1993, now abandoned, which is a continuation of application Ser. No.929,737, filed Aug. 13, 1992, now abandoned, which is a continuation of application Ser. No. 792,547, filed Nov. 15, 1991, now abandoned, which is a continuation of application Ser. No. 655,268, filed Feb. 13, 1991, now abandoned, which is a continuation of application Ser. No. 487,688, filed Mar. 2, 1990, now abandoned, which is a continuation of application Ser. No. 211,347, filed Jun. 24, 1988, now abandoned, which is a continuation of application Ser. No. 745,919, filed Jun. 18, 1985, now abandoned.

This invention relates to an animal feed additive containing zinc bacitracin which, when mixed with a feed, exhibits better stability under the effect of heat and moisture and mechanical processing, with the result that the zinc bacitracin contained therein loses only a minor part of its activity even after fairly long storage under unfavorable conditions.

BACKGROUND OF THE INVENTION

Zinc bacitracin is a performance-promoting substance which is added to animal fodder as a feed additive to improve the utilization of the fodder and hence increase the daily weight gain. In chemical terms, zinc bacitracin is a cyclic polypeptide which is relatively stable in solid and dissolved form. In feed mixtures zinc bacitracin is substantially less stable, a fact which is blamed partly on the effect of heat and moisture during the pelleting of the fodder and the mechanical stress during the processes of mixing the feed additive with the fodder, and also on reactions with heavy metals present in the fodder, such as copper and iron, and with organic compounds such as ascorbic acid.

Numerous expedients have been tried to overcome the known disadvantages and stabilize zinc bacitracin in feed mixtures. Until now, however, nobody has succeeded in finding a fully satisfactory and practical solution to the problem of the reduction in the zinc bacitracin content under normal and particularly under unfavorable conditions of processing and storage, with the result that instances of accidental overdosing could not be ruled out due to the uncertainty as to the zinc bacitracin content.

German Offenlegungsschrift 2,745,035 describes a process in which zinc bacitracin is precipitated from a culture broth, mixed with calcium carbonate and spray-dried, This method makes use, on the one hand, of the greater stability of the zinc compound with respect to bacitracin, and on the other hand spray-drying ensures that the product has a very low water content. Spray-drying is based on the principle of eliminating water from a formulation. The disadvantage of this process is the fact that the costs are higher than with other drying methods. Moreover, dried products very quickly reabsorb the quantity of water corresponding to the adsorption isotherm, which means that all production and packaging steps subsequent to spray-drying must be carried out under conditions of low moisture.

OBJECTS OF THE INVENTION

It is an object of the present invention to provide a feed additive containing zinc bacitracin which has improved stability after being mixed with fodder or when made into pellets and permits longer storage.

Another object is to produce the feed additive with conventional equipment and machinery while avoiding the disadvantages of the prior art described above.

Still another object is to obtain the feed additive in the form of the smallest possible particles to permit homogeneous distribution in the fodder.

Other objects and advantages of the invention will become apparent as the description thereof proceeds.

DESCRIPTION OF THE INVENTION

The above objects are achieved according to the invention by providing the feed additive containing zinc bacitracin with a polymer coating.

For embedding the feed additive in this way it is theoretically possible to use all those substances which are capable of forming a coating over the substance which is to be protected and thus providing mechanical protection; for example:

polymers such as polysaccharides or polyacrylates;

fats, fatty compounds or waxes; and surfactants.

It should be borne in mind that the substances which form the coating should dissolve or swell under physiological conditions (in the stomach, intestine or first stomach in the case of ruminants) to enable the active substance to be released.

Coatings of polyacrylates and polysaccharides have proved satisfactory, but coatings of hydroxypropylmethyl cellulose, hydroxyethyl cellulose and methyl cellulose are particularly preferred.

The proportion of polymer is between 1 and 30% by weight, preferably from 5 to 20% by weight, based on the weight of the starting material which is a mixture of 5–40% by weight, preferably 15–25% by weight, of zinc bacitracin and 60–95% by weight, preferably 75–85% by weight, of a carrier.

It goes without saying that stabilization of the feed additive according to the invention is achieved even with higher polymer concentrations, but it is within the purview of the present invention to keep the quantity of polymer as small as possible.

The carrier may consist of 20–80% by weight of fermentation residue (silage) and 20–80% by weight of calcium carbonate; preferably, it consists of 75% by weight of fermentation residue and 25% by weight of calcium carbonate. Other carriers; particularly those specified in the feed regulations of May 1983 published in the Federal German Law Bulletin, may be used.

A variety of different methods are available for preparing the feed additive containing zinc bacitracin according to the invention.

The simplest method of coating with polymers is the moist mixture method. The substance which is to be protected is intensively mixed with a solution of the coating material and then granulated. After the granules have been dried, the agglomerates produced are ground again.

Another method is spray-hardening, for example, in which the substance to be protected is incorporated in molten materials. During spraying, small spherical particles are produced which harden upon cooling.

In micro-encapsulation, the substance to be protected is coated with polymers, using the methods described in the literature. Whereas dissolved or liquid substances are relatively easy to encapsulate, problems may occur with solids, depending on the particle form, as a result of incomplete application of the coating.

In a preferred process according to the invention, the feed additive containing zinc bacitracin is coated with a polymer in a fluidized bed granulator. The feed additive consisting of a mixture of 5–40% by weight, preferably 15–25% by weight, of zinc bacitracin and 60–95% by weight, preferably 75–85% by weight of a carrier is fluidized by means of an air current, and then the polymer, preferably hydroxypropylmethyl cellulose, hydroxyethyl cellulose or methyl cellulose, is sprayed into the fluidized bed in dissolved form through a nozzle.

Any organic and aqueous solvents or mixtures of solvents wherein the polymer is soluble may be used to prepare the polymer solution. If necessary, a suspension of the polymer in a suitable solvent may also be used. The preferred solvents are water, methanol or dichloromethane or mixtures of solvents such as methanol/dichloromethane in the ratio 1:1.

When selecting the solvents it is important to choose those having a relatively low boiling point, so that no residues of solvent remain in the feed mix after processing.

The smallest possible particle size for the feed additive containing zinc bacitracin is desirable in order to ensure uniform distribution of the feed additive in the feed mixture.

The formation of agglomerate, and hence the particle size, can be controlled by means of the rate of spraying; the formation of agglomerate increases as the spraying rate increases.

The feed additive containing zinc bacitracin coated with polymer by the process of the invention is distinguished over the untreated commercial product in admixture with feeds by a substantially lower decomposition of the zinc bacitracin even under unfavorable storage conditions at elevated temperatures, so that, contrary to present practice, the content of zinc bacitracin in finished feed mixtures can be determined even after a fairly long storage time and the tolerances prescribed by the statutes can be monitored.

Additional advantages of the feed additive having a polymer coating are its noticeably reduced odor compared with the untreated product and a substantially reduced production of dust during processing. The feed additive according to the invention is suitable for improving utilization of fodder in the fattening of animals.

The following examples illustrate the present invention and will enable others skilled in the art to understand it more completely. It should be understood, however, that the invention is not limited solely to the particular examples given below.

Example A:

Starting material:
  Zinc bacitracin 20% by weight
  Calcium carbonate 20% by weight
  Fermentation residue 60% by weight
Polymer solution:
  Hydroxypropyl methyl cellulose in the form of an aqueous solution (5% or 7%)
Quantity of polymer:
  5% or 20% by weight based on the weight of starting material
Spray conditions:
  Apparatus: WT 1, Glatt Co.
  Spraying rate: about 15 ml/min.
  Air temperature: about 60° C.

The starting material was fluidized in a fluidized bed granulator by means of an air current, and then a solution of the hydroxypropyl methyl cellulose was sprayed into the fluidized bed through a nozzle. The feed additive prepared according to Example A had the following particle size distributions:

| Screen size (µm) | Proportion (%) |
|---|---|
| Quantity of polymer 5%: | |
| <250 | 8 |
| 250–500 | 32 |
| 500–1000 | 60 |
| Quantity of polymer 20%: | |
| 250–500 | 6 |
| 500–1000 | 60 |
| >1000 | 34 |

The following example shows that the particle distribution can be shifted towards smaller particles at the same spraying rate by using an organic solvent (methanol/methylene chloride =1:1):

| Quantity of polymer 10%: | |
|---|---|
| Screen size (µm) | Proportion (%) |
| <125 | 30 |
| 125–250 | 20 |
| 250–500 | 35 |
| >500 | 15 |

The composition of the feed mixtures tested is shown in Table I below. The coating in recipes $R^2$ and $R^3$ was prepared according to the preferred embodiment of the process according to the invention, but in recipe $R^1$ the starting material was not treated. The feed mixtures were prepared by making 2 preliminary mixtures in a mortar and carrying out the final mixing in a cube mixer.

Piglet fodder II (composition according to the fodder regulations of May 1983) was used as the fodder since it had a particularly high content of iron, copper, manganese and zinc.

TABLE I

Composition of the feed additive mixtures tested (values in g):

| | $R^1$ | $R^2$ | $R^3$ |
|---|---|---|---|
| Zinc bacitracin 20% </br> Calcium carbonate 20% </br> Fermentation residue 60% | 0.25 | 0.25 | 0.25 |
| Hydroxypropylmethyl-cellulose | — | 0.0125 | 0.05 |
| Piglet fodder II | 999.75 | 999.7375 | 999.70 |
| Total | 1000.00 | 1000.0000 | 1000.00 |

Stability results of the feed mixtures:

The samples were stored for 4 weeks at the following temperatures: RT (room temperature, about 21° C.), 31° C., 41° C. and 51° C. They were then tested microbiologically (Official Journal of the European Communities, Jan. 18, 1984, No. L 15/28).

The results of the microbiological investigations are shown in Table II below:

TABLE II

Residual content of zinc bacitracin as a function of the composition and storage conditions (values in %)

| Temperature (°C.) | $R^1$ | $R^2$ | $R^3$ |
|---|---|---|---|
| RT | 90.4 | 96.7 | 96.2 |
| 31 | 52.9 | 70.0 | 81.4 |
| 41 | 21.4 | 60.0 | 59.5 |
| 51 | 7.6 | 46.2 | 59.5 |

These results indicate that zinc bacitracin in fodder is stabilized by hydroxypropyl methyl cellulose. Compared with the composition $R^2$ sprayed with 5% polymer, $R^3$ (20% polymer) is marginally better.

In addition to these tests at unfavorable elevated storage temperatures, the long-term characteristics of fodder according to the invention and standard commercial fodder containing zinc bacitracin were tested. Unless otherwise stated, the polymer concentration was 20% based on a feed additive consisting of 20% zinc bacitracin, 20% calcium carbonate and 60% fermentation residues.

Table III shows the residual content of zinc bacitracin in a sole fodder for fattening chickens (type 7.7) with an initial concentration of zinc bacitracin of 50 ppm after storage for 1, 3 and 6 months at various temperatures.

In order to investigate the effect of pelleting, (steam conditioning) is which the feed mixture is briefly exposed to high temperatures (up to 110° C.) and high humidity, the batches were subdivided; half were then pelleted and subsequently subjected to the same storage conditions as the non-pelleted samples. As is shown by tests $R^4$ to $R^7$, the samples coated with hydroxypropyl methyl cellulose ($R^5$ and $R^7$) have a higher content of bacitracin than the untreated samples $R^4$ and $R^6$ in every case, even after prolonged storage.

TABLE III

Residual content of zinc bacitracin in a fodder for fattening chickens (type 7.7) with an initial content of 50 ppm (values in %).

| | stored at | $R^4$ (untreated) | $R^5$ (HPMC) | $R^6$ (untreated, pelleted) | $R^7$ (HPMC, pelleted) |
|---|---|---|---|---|---|
| 1 month | RT | — | — | 36 | 65 |
| | 26° C. | — | — | 24 | 60 |
| 2 months | RT | 54 | 93 | 23 | 47 |
| | 26° C. | 32 | 77 | 8 | 33 |
| 6 months | RT | 47 | 95 | 17 | 47 |
| | 26° C. | — | 73 | — | 20 |

HPMC = Hydroxypropylmethyl cellulose
RT = Room temperature 21° C.

TABLE IV

Residual content of zinc bacitracin in a fodder for fattening pigs (type 2.6) with an initial content of 20 ppm (values in %).

| | stored at | $R^8$ (untreated) | $R^9$ (untreated, pelleted) | $R^{10}$ (HPMC) | $R^{11}$ (HPMC, pelleted) |
|---|---|---|---|---|---|
| Initial value | | 100 | 66 | 100 | 100 |
| 6 months | RT | 79 | 52 | 100 | 73 |

As is shown by a comparison of the initial values of tests $R^8$ to $R^{11}$ in Table IV, the loss of activity of zinc bacitracin in an untreated sample ($R^8$ and $R^9$) is already 30% at the pelleting stage, whereas the sample $R^{10}$ coated with hydroxypropyl methyl cellulose shows no measurable loss of activity caused by pelleting ($R^{11}$). Even after 6 months' storage, the feed additive according to the invention has a higher zinc bacitracin activity than the untreated feed additive.

TABLE V

Residual content of zinc bacitracin in a fodder for laying hens (type 7.4) with an initial concentration of 100 ppm of zinc bacitracin after 6 months' storage (values in %).

| | stored at | $R^{12}$ (untreated) | $R^{13}$ (untreated, pelleted) | $R^{14}$ (HPMC) | $R^{15}$ (HPMC, pelleted) |
|---|---|---|---|---|---|
| 6 months | RT | 77 | 28 | 100 | 70 |
| | 26° C. | — | — | 96 | 58 |
| | 31° C. | — | — | 88 | 42 |

In another test arrangement, both untreated feed additive and also feed additive containing zinc bacitracin and coated with hydroxypropyl methyl cellulose (HPMC), methyl cellulose (MC) and hydroxypropyl cellulose (HPC) was stored for 4 weeks in glass and polyethylene containers (PE) at 21° C. and at a relative humidity of 60%. In this series of tests, the polymer concentration was varied between 10 and 20%. The results are shown in Table VI.

TABLE VI

Residual content of zinc bacitracin in a fodder for fattening chickens (type 7.7) with an initial content of 50 ppm (values in %):

| Test | Polymer | Initial value (non-pelleted) | Initial value (pelleted) | (Non-pelleted) Glass | (Non-pelleted) PE | (Pelleted) Glass | (Pelleted) PE |
|---|---|---|---|---|---|---|---|
| $R^{16}$ | untreated | 77 | 68 | 48 | 41 | 19 | 24 |
| $R^{17}$ | HPMC 10% | 100 | 94 | 80 | 94 | 53 | 60 |
| $R^{18}$ | HPMC 15% | 97 | 85 | 79 | 96 | 61 | 69 |
| $R^{19}$ | HPMC 20% | 96 | 82 | 77 | 97 | 70 | 73 |
| $R^{20}$ | MC 10% | 96 | 80 | 93 | 92 | 63 | 68 |
| $R^{21}$ | MC 20% | 100 | 82 | 73 | 93 | 84 | 67 |
| $R^{22}$ | HPC 10% | 95 | 85 | 92 | 74 | 54 | 51 |
| $R^{23}$ | HPC 15% | 99 | 86 | 88 | 90 | 64 | 55 |
| $R^{24}$ | HPC 20% | 99 | 81 | 93 | 84 | 65 | 54 |

Table VII shows the 4 weekly values of a feed additive coated with polyacrylate. The polymer content was 30%.

TABLE VII

Residual content of zinc bacitracin in a piglet fodder II with an initial content of 50 ppm (values in %):

| Temperature (°C.) | $R^{25}$ (30% Eudragit$^R$ E 100) 4 weeks |
|---|---|
| 21° C. | 71 |
| 31° C. | 63 |
| 41° C. | 47 |

The above examples demonstrate the stabilization of zinc bacitracin in feed mixtures by treatment with-the coatings according to the invention compared with untreated feed additives.

Example B:

Preparation of a feed additive according to the invention, using the preferred process. Batch: 240 kg 200 kg of commercially available feed additive in the form of a powder consisting of 20% zinc bacitracin, 20% $CaCO_3$ and 60% fermentation residues were sprayed with a solution of 40.0 kg of hydroxypropyl methyl cellulose in 531.42 liters of purified water in a fluidized bed granulator (type WSG 200 made by the Glatt Co., fitted with a lifting piston pump, type HL 1L made by the Lewa Co.). Then, 3 liters of purified water were sprayed into the fluidized bed. After spraying had ended, the air heating device was turned off and the product was cooled to a temperature of 45° C.

Spraying conditions:
Quantity of air, spraying:

1000–5000 $m^3$ per hour

Air temperature, spraying:

about 100° C.

Spraying rate about:

1600 ml/min.

Spray nozzle:

1.2 mm (6-way)

Overpressure of spray air:

Pe =about 4 bar

Quantity of air, cooling phase:

about 5000 $m^3$ per hour

The filter was shaken for 5 seconds every 90 seconds.

At the start of spraying, the feed additive was present as a fine compact powder which formed a light, loose granulate in the course of the spraying phase. The formation of granules with a resultant substantial increase in volume must be taken into account in the batch size. Therefore, spraying must also be started with a relatively small quantity of air and increased during the spraying phase as more and more granulate is formed.

After spraying had ended, the granules were screened in a screen granulator made by the Frewitt Co. with a screen insert having a mesh size of 1.0 mm (rotating, moderate speed), and then mixed for 100 minutes in a rotating spit mixer made by the Lermer Co.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claim.

We claim:

1. A zinc bacitracin—containing animal feed additive, in particulate form, having an external coating of an alkyl cellulose polymer.

2. The feed additive of claim 1 wherein the external coating is an alkyl cellulose polymer selected from the group consisting of hydroxypropyl methyl cellulose, hydroxypropyl cellulose and methyl cellulose.

3. The feed additive of claim 2 wherein the alkyl cellulose polymer comprises 1–30% by weight based on the initial weight of the feed additive.

4. The feed additive of claim 3 wherein the alkyl cellulose polymer comprises 5–20% by weight.

5. The feed additive of claim 4 wherein the alkyl cellulose is hydroxy- propyl methyl cellulose.

6. A method of fattening domestic animals which comprises feeding the animals with fodder containing the zinc bacitracin—containing feed additive of claim 1.

7. A zinc bacitracin—containing feed additive, in particulate form, comprising zinc bacitracin, silage and calcium carbonate, having an external coating of an alkyl cellulose polymer.

8. The feed additive of claim 7 wherein the the external coating is an alkyl cellulose polymer selected from the group consisting of hydroxypropyl methyl cellulose, hydroxypropyl cellulose and methyl cellulose.

9. The feed additive of claim 8 wherein the alkyl cellulose polymer comprises 1–30% by weight based on the initial weight of the feed additive.

10. A method of fattening domestic animals which comprises feeding the animals with a fodder containing the zinc bacitracin—containing feed additive of claim 7.

11. The feed additive of claim 7 comprising 5–40% by weight of zinc bacitracin, 20–80% by weight of silage and 20–80% by weight of calcium carbonate.

12. The feed additive of claim 11 having 60–80% by weight of silage.

* * * * *